A. CLASSEN.
PROCESS FOR PRODUCING AMMONIA.
APPLICATION FILED OCT. 8, 1915.

1,256,875. Patented Feb. 19, 1918.

Inventor
Alexander Classen

By Foster Freeman Watson & Corl
Attorney

UNITED STATES PATENT OFFICE.

ALEXANDER CLASSEN, OF AACHEN, GERMANY.

PROCESS FOR PRODUCING AMMONIA.

1,256,875.   Specification of Letters Patent.   Patented Feb. 19, 1918.

Application filed October 8, 1915. Serial No. 54,897.

*To all whom it may concern:*

Be it known that I, ALEXANDER CLASSEN, a subject of the German Emperor, and resident of Aachen, Germany, have invented certain new and useful Improvements in Processes for Producing Ammonia, of which the following is a specification.

My invention relates to a process for the production of ammonia from its elements by the action of electric discharges.

According to experiments made prior to making the present invention I have succeeded in directly combining nitrogen and hydrogen by submitting a mixture of the gases to the action of dark electric discharges in the presence of suitable contact substances.

I have now ascertained that a better output of ammonia is obtained if the gas mixture is subjected to the simultaneous action of dark discharges and spark discharges.

The contact or catalytic agents to be used are for instance gold, platinum, and the other metals of the platinum group, the metals of the iron group (iron, nickel, cobalt, manganese, chromium, molybdenum, tungsten, uranium), as well as alloys or compounds of these metals or compounds of the metals and other elements. Preferably the catalytic agents are deposited on suitable carriers.

It has been further ascertained that an especially good output of ammonia is obtained if colloidal metals or metallic alloys are used. Among the colloidal contact metals those modifications have proved to be especially efficient, which have been transformed into a state of fine distribution with the aid of a protective colloid such as for instance gelatose.

The new process is preferably carried out in the following manner: A mixture of nitrogen and hydrogen is made to pass over the contact mass between the two electrodes. Preferably the temperature within the contact chamber is kept at 50 to 90 degrees C., but it may as well be higher and in some cases it may even be lower than 50 degr. In general, however, the temperature should not be below 25 degr. C. One electrode should consist of a good conductor such as copper or brass, while the other one should consist of a bad conductor such as glass or porcelain. Thus for instance a porcelain electrode surrounded by a cooling medium (water) may concentrically surround the metal electrode, the space left between the electrodes serving as contact chamber. The metal electrode is connected with the positive terminal of an inductor, the wire connected with the negative terminal being immersed in the water surrounding the porcelain tube.

The generation of dark discharges and spark discharges necessary for a successful operation of the process is obtained by employing apparatus of suitable form and dimensions. If for instance the distance between the metal electrode and the porcelain electrode is great spark discharges will be produced; on the other hand, if the distance is very small, only dark discharges will be obtained. It is easy to ascertain in each case the most favorable distance for simultaneously obtaining dark discharges and spark discharges.

The synthetic production of ammonia according to the present invention may also be carried into effect by separately rendering nitrogen and hydrogen electrically active and passing the active gas mixture over a catalytic substance.

In all cases the combination of nitrogen with hydrogen can be effected under reduced, ordinary or increased pressure.

In carrying the process into effect it has further been ascertained that the efficiency of the different contact substances employed is dependent to a high degree on the chemical nature of the carrier on which they have been disposed. If for instance the contact substances proper such as platinum, gold or the like are disposed on silicate carriers of an acid character, the output of ammonia is increased, whereas by using certain basic carriers such as magnesia the output of ammonia is lessened.

The important rôle played by the acid nature of the carrier employed can be made clear by a comparison between different kinds of asbestos carriers. Contrary to what one would have expected, different kinds of asbestos will act in a different way, the efficiency of contact substances prepared with the aid of asbestos being dependent on the chemical nature of the particular kind of asbestos used, that is to say, of the relation of silica to the oxids contained therein. Thus in the present case the hornblende or olivin asbestos and similar products are more efficient than the ordinary asbestos uniformly used up to this time as a carrier in all laboratories and chemical works.

By increasing the acid character of the carriers to be employed their efficiency may be further increased. Thus for instance asbestos may be impregnated with a solution of water-glass of suitable concentration, and the silica of the water-glass may then be precipitated by adding an acid. The mass obtained after having been washed, dried and calcinated forms a highly efficient carrier for the contact substances to be used in carrying the invention into effect. It is quite possible however to employ ordinary asbestos which has been partly decomposed by a prolonged treatment with hydrochloric acid, silicic acid being separated out.

Instead of asbestos, kieselguhr or the like other substances of an acid character, other minerals or artificial products and by-products such as slag-wool may be employed as carriers. Instead of silicates silicic acid itself and more especially the silicic acid obtained by precipitating a water-glass solution with acid may be used, the silicic acid obtained in this manner being adapted to take up colloidal metals such as gold, platinum and the like. By agitating it with colloidal metal solutions, filtering and then drying it, highly efficient contact substances may be obtained.

Of course, by mixing silicic acid or another suitable acid material with indifferent substances efficient contact carriers of an acid character may be prepared. In many cases it has been proved useful to employ the carrier in great excess (of twenty times or more) of the contact substance proper. I wish it to be understood that my invention is by no means limited to the use of the acid carrier aforesaid. On the contrary, the invention may also be carried out with a great variety of catalytic agents, other metals or metal alloys or metal compounds and mixtures of such metals, alloys and compounds with each other or with other substances, all these catalytic agents being combined with carriers of an acid nature, and the most efficient contact substances being then ascertained by a simple test. It is important however that in the contact substance ready for use the acid character of the carrier still predominates.

It has further been ascertained that the high efficiency of the acid contact substance carriers is not limited to the process described above for producing ammonia by simultaneously treating a mixing of nitrogen and hydrogen with dark discharges and spark discharges. It has been ascertained that contact substances disposed on carriers having an acid character will equally increase the output of other processes for directly combining nitrogen and hydrogen by aid of electric discharges. Thus for instance, in the process for synthetically producing ammonia by subjecting nitrogen and hydrogen to the action of dark electric discharges alone, as described by applicant in a former application, a considerable increase in the output of ammonia can be obtained by replacing the catalytic substances disposed on different carriers by contact substances comprising carriers of an acid character.

Figure 1:
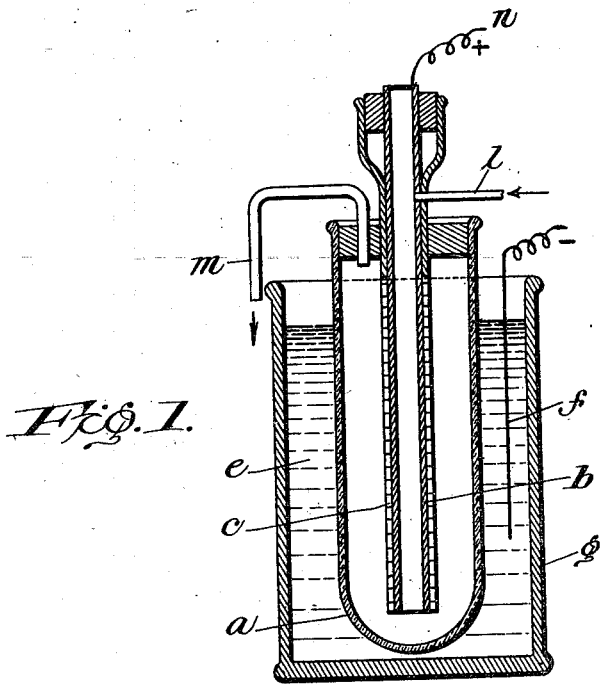
Figure 1 is vertical sectional view through an apparatus, such as hereinbefore referred to, adapted to carry out the improved process.

Referring to the drawing $a$ designates a tube, closed at the lower end, of some material that is a poor conductor of electricity, for example porcelain or glass, which is immersed in a suitable cooling medium, as water, $e$ contained in a receptacle $g$.

Within the tube $a$ is positioned the metal electrode, which is shown as a tube $b$ of copper, for example, to which is connected a positive terminal $n$. The negative terminal $f$ is immersed in the body of water $e$ and the electrical discharges occur in the space between the tubes $a$ $b$ the contact substance being applied directly to the latter as by means of a suitable fabric $c$ impregnated with the contact substance or by means of an asbestos sleeve containing such substance. The gas mixture to be treated enters the tube $b$, through a conduit $l$, and passes from the lower end thereof up through the chamber or space between said tube and the inner wall of the tube $a$, over the contact substance, the formed ammonia passing out through conduit $m$.

Figure 2:
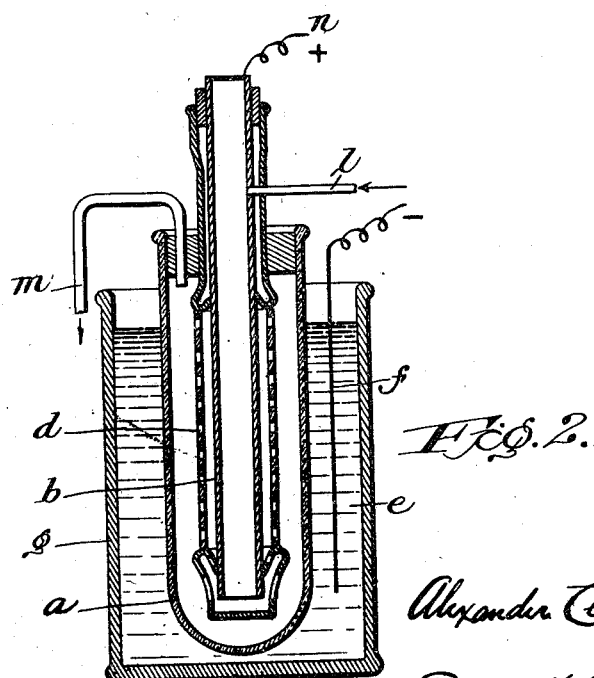
Fig. 2 is a similar view of a slightly modified form of apparatus.

In the apparatus shown in Fig. 2 a metal net $d$ is arranged within the tube $a$, being insulated from the tube $b$ at both ends, to provide two concentric reaction chambers. By this arrangement a large upwardly moving, brush-form, spark is produced between the tube $b$ and net $d$.

I claim:—

1. The process for producing ammonia which consists in subjecting a mixture of nitrogen and hydrogen to the simultaneous action of dark discharges and spark discharges in the presence of a catalytic active substance.

2. The process for producing ammonia which consists in subjecting nitrogen and hydrogen separately to the simultaneous action of dark discharges and spark discharges, mixing the gases so treated and subjecting the mixture to the action of a catalytic active substance.

3. The process for producing ammonia which consists in subjecting nitrogen and hydrogen separately to the simultaneous action of dark discharges and spark discharges, mixing the gases so treated and subjecting the mixture to the simultaneous action of dark discharges and spark discharges in the presence of a catalytic active substance.

4. The process for producing ammonia which consists in subjecting a mixture of nitrogen and hydrogen to the simultaneous action of dark discharges and spark discharges in the presence of a catalytic active colloidal substance.

5. The process for producing ammonia which consists in subjecting a mixture of nitrogen and hydrogen to the simultaneous action of dark discharges and spark discharges in the presence of a catalytic active colloidal substance reduced to a state of fine distribution by aid of a protective colloid.

6. The process for producing ammonia which consists in subjecting a mixture of nitrogen and hydrogen to the simultaneous action of dark discharges and spark discharges in the presence of a catalytic active colloidal substance reduced to a state of fine distribution by aid of gelatose.

7. The process for producing ammonia which consists in subjecting nitrogen and hydrogen to the simultaneous action of dark discharges and spark discharges in the presence of a catalytic active substance disposed on a carrier of an acid nature.

8. The process for producing ammonia which consists in subjecting nitrogen and hydrogen to the simultaneous action of dark discharges and spark discharges in the presence of a catalytic active substance disposed on a carrier of an acid nature, said carrier being greatly in excess of the catalytic active substance.

9. The process for producing ammonia which consists in subjecting nitrogen and hydrogen to the simultaneous action of dark discharges and spark discharges in the presence of a catalytic active substance disposed on a carrier containing the group $SiO_2$.

10. The process for producing ammonia which consists in subjecting nitrogen and hydrogen to the action of dark discharges and spark discharges in the presence of a catalytic active substance disposed on a carrier containing silicic acid obtained by acting with an acid upon a water-glass solution.

11. The process for producing ammonia which consists in conducting a mixture of nitrogen and hydrogen in contact with a catalytic active substance through simultaneous dark discharges and spark discharges passing between a metal electrode and a dielectric.

12. The process for producing ammonia which consists in conducting a mixture of nitrogen and hydrogen in contact with a catalytic active substance disposed on a carrier of an acid nature, through simultaneous dark discharges and spark discharges passing between a metal electrode and a dielectric.

In testimony whereof I have signed my name to this specification in the presence of two subscribing witnesses.

ALEXANDER CLASSEN.

Witnesses:
HENRY HASPER,
ARTHUR SCHROEDER.